Jan. 22, 1924.
G. DUNSIETH, JR
1,481,542
APPARATUS FOR UNLOADING CONVEYERS
Filed Nov. 9, 1922    2 Sheets-Sheet 2
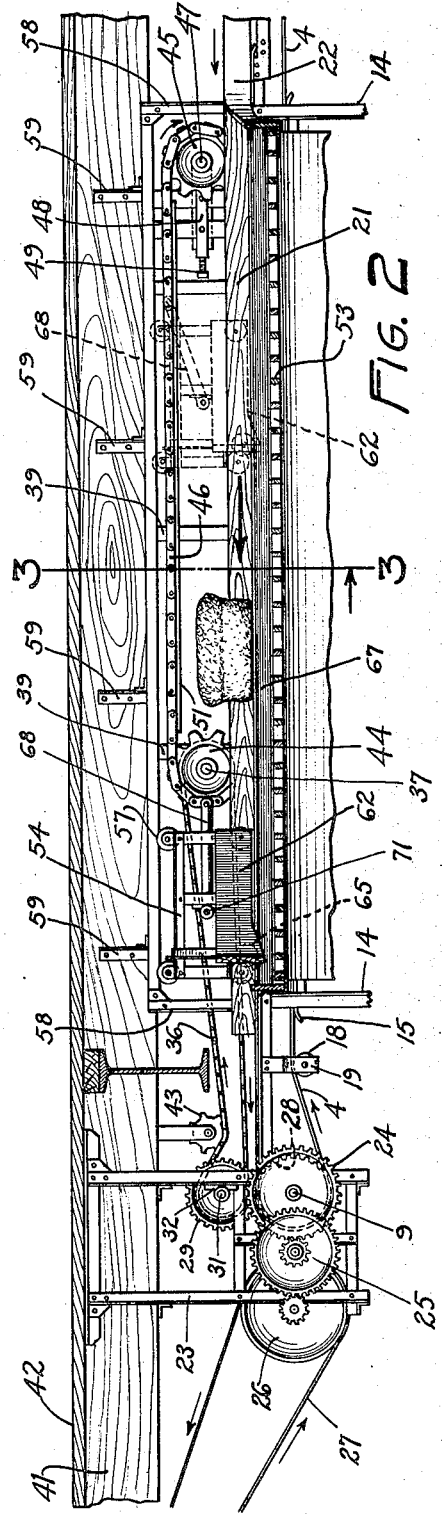
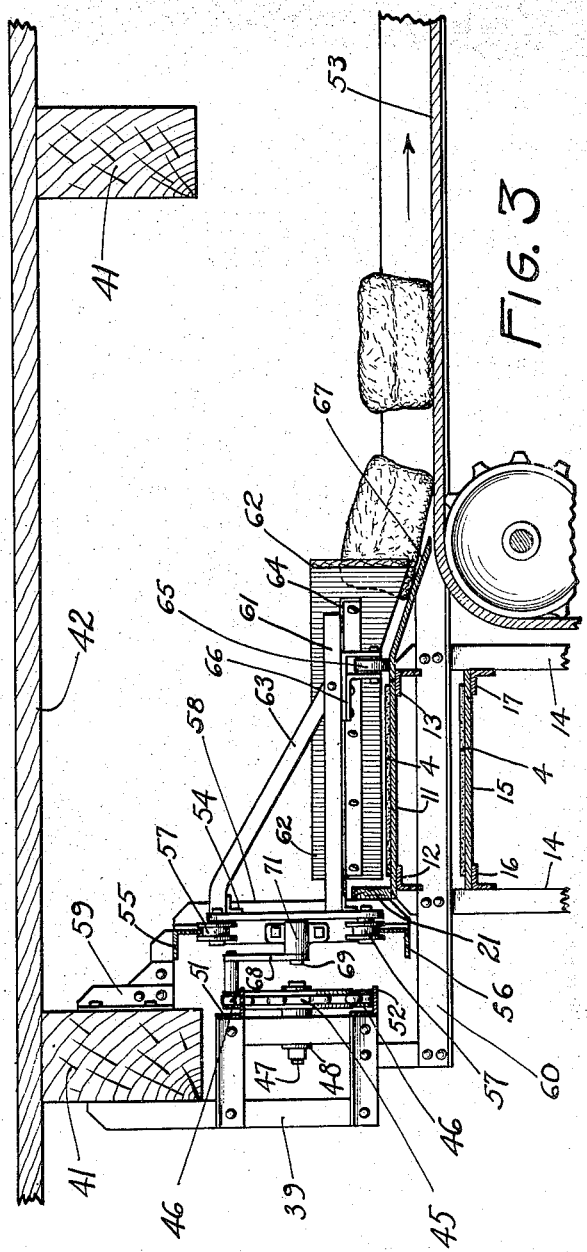
INVENTOR
GEORGE DUNSIETH, JR.
By Paul, Paul & Moore
ATTORNEYS Patented Jan. 22, 1924.

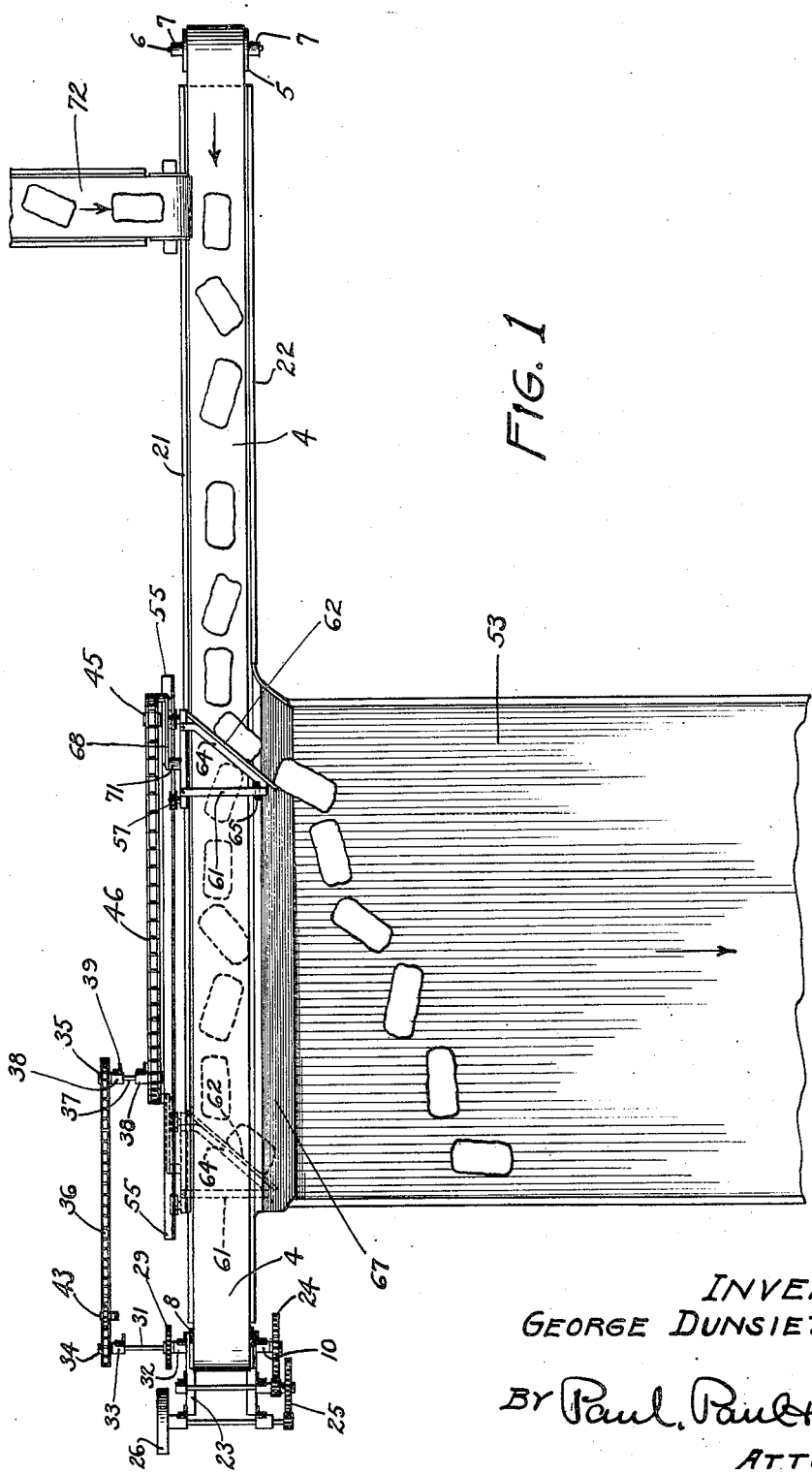

1,481,542

UNITED STATES PATENT OFFICE.

GEORGE DUNSIETH, JR., OF ELLWOOD CITY, PENNSYLVANIA, ASSIGNOR TO MATHEWS GRAVITY CARRIER COMPANY, OF ELLWOOD CITY, PENNSYLVANIA, A CORPORATION OF PENNSYLVANIA.

APPARATUS FOR UNLOADING CONVEYERS.

Application filed November 9, 1922. Serial No. 599,830.

*To all whom it may concern:*

Be it known that I, GEORGE DUNSIETH, Jr., a citizen of the United States, residing in Ellwood City, county of Lawrence, and State of Pennsylvania, have invented certain new and useful Improvements in Apparatus for Unloading Conveyers, of which the following is a specification.

This invention relates to improvements in apparatus adapted for use in unloading or deflecting from a conveyer loaves of bread or other articles or packages. I have illustrated and described the invention as used in connection with bread cooling machines.

In bakeries where large quantities of bread are manufactured it is desirable to convey the hot loaves of bread from the bake ovens to a cooler, where they are cooled, preparatory to being wrapped or put in storage for transit. In delivering the hot loaves of bread onto the trays, pallets or conveyers of the cooler, care should be exercised, in order to get the best results, to distribute the loaves evenly upon the bread supporting devices of the cooler.

By the use of the apparatus herein shown the hot loaves may be unloaded or deflected from the delivery conveyer onto the cooler by means of a reciprocating plate or deflector, adapted to travel from side to side of the cooler directly above the delivery conveyer belt, thus distributing the loaves of bread over the surface of the cooler.

The specific object of this invention, therefore, is to provide apparatus for unloading hot loaves of bread, or other articles from a conveyer and distributing said loaves or articles upon the surface of a cooler conveyer, or other receiving means, without the use of manual labor.

Other objects of the invention will more fully appear from the following detailed description taken in connection with the accompanying drawings, in which—

Figure 1 is a plan view of a belt conveyer showing my unloading device arranged in connection therewith;

Figure 2 is a side elevation showing the means provided for operating the unloading plate or deflector;

Figure 3 is a cross sectional view on the line 3—3 of Figure 2, showing how the bread or other articles are unloaded from the conveyer.

In the selected embodiment of the invention here illustrated, for purposes of disclosure, there is shown a conveyer of usual construction comprising an endless flexible belt 4, carried at one end by a roll 5, loosely mounted upon a short shaft 6 supported by bearings 7, and having its other end carried by a similar roll 8 mounted upon a shaft 9, rotatably supported in suitable bearings 10, secured to the frame, hereinafter described. Means are also provided for supporting the conveyer belt 4 between the rolls 7 and 8. The upper or working side of the belt is supported by means of a plate 11, preferably secured to the top face of longitudinally opposed angle bars 12 and 13, secured to the upper ends of the upright supporting legs or standards 14, resting upon the floor (Figures 2 and 3). The lower or free side of the belt is preferably supported in a similar manner by means of a plate 15 resting upon a pair of similarly opposed angle bars 16 and 17, also secured to the upright standards 14. A guide roll 18 is rotatably mounted in suitable brackets 19, preferably secured to the angle bars 12 and 13, and functions in guiding the lower or free side of the conveyer belt onto the supporting plate 15. (Figure 6). The usual stationary side rails 21 and 22 are preferably provided on each side of the conveyer belt to prevent the articles being conveyed thereon from accidentally dropping off the conveyer.

A supporting frame 23, constructed preferably of angle bars, is provided at the unloading end of the conveyer belt 4. This frame supports the shaft 9 of the conveyer, by means of the bearings 10 secured thereto. A gear wheel 24 is secured to one end of the shaft 9 and is adapted to be operated by a train of gears 25, also mounted upon said frame, and operable by means of a pulley 26 and flexible belt 27, connected to a motor or other suitable source of power.

A toothed gear wheel 28 is secured to the other end of the shaft 9 and is adapted to engage a similar wheel 29 mounted upon a short shaft 31, rotatably mounted in suitable bearings 32 and 33, substantially above the shaft 10. A sprocket wheel 34 is secured to the outer terminal end of the shaft 31, and co-operates with a similar wheel 35 to carry an endless chain 36. The sprocket wheel 35 is secured upon the end of a shaft 37, rotatably mounted in suitable bearings 38, preferably secured to a frame 39, secured to the joists 41 supporting the usual floor 42. An idle sprocket wheel 43 is provided to take up slack in the chain 35, should it become loose from wear, etc.

A suitable sprocket wheel 44 is secured to the shaft 37, preferably upon the end opposite that on which the sprocket wheel 35 is mounted, and is adapted to co-operate with a similar sprocket wheel 45 to carry a suitable chain 46. The sprocket wheel 45 is rotatably mounted upon a stud 47 secured to a bracket 48, which is adjustably mounted upon the frame 39. An adjusting screw 49 is in threaded engagement with the bracket 48 and functions in taking up slack in the chain 46. Means are also provided for supporting this chain between the sprocket wheels 44 and 45, to prevent said chain from sagging. Such means consist preferably of upper and lower angle bars 51 and 52 secured to the frome 39 (Figure 3).

The means provided for unloading or deflecting the loaves of bread from the delivery conveyer 4 onto the cooler conveyer 53 consists of an unloading plate or deflector 62 preferably supported upon a carriage 54, reciprocally mounted upon a pair of longitudinal rails 55 and 56 by means of anti-friction grooved rollers 57, rotatably mounted upon the frame of the carriage 54 and adapted to travel forward and backward upon said rails. These rails are arranged in parallel relation adjacent the guard rail 21 and are preferably connected together at their ends by means of upright angle bars 58. Brackets 59 secure the rail 55 to the joist 41. The lower portion of the upright angle bars 58 may be secured to the side rails 21, if desired, thus providing a very rugged rail construction upon which the unloading carriage 54 may travel. Angle bars 60 may also be provided to connect the frame 39 to the upright standards, 14, for the purpose of reinforcing or strengthening the frame construction. A horizontal bar 61, preferably of angle iron, has one end secured to the lower rear portion of the carriage 54, and outwardly projects therefrom to provide a support for the outer end of the deflector blade 62. The outer end of the bar 61 is preferably connected to the upper portion of the carriage 54 by a suitable brace member 63 secured thereto. A diagonal bar 64 has one end secured to the lower forward portion of the carriage 54 and has its other end secured to the outer end of the horizontal bar 61, (Figure 1), thus providing a horizontal extension of the carriage 54, substantially integral therewith. The outer end of this extension is supported by means of an anti-friction roller 65, rotatably mounted in a suitable bracket 66, preferably secured to the under side of the horizontal bar 61, and adapted to ride upon the upper horizontal surface of an inclined plate 67 (Figure 3). This plate functions in closing the gap between the conveyer belt 4 and the cooler conveyer 53, or any other suitable conveyer or receiving means upon which it may be desired to unload the articles. The upper horizontal edge of the plate 67 is preferably secured to the upper face of the angle bar 13 with its top surface flush with the top surface of the belt supporting plate 11, thus presenting a smooth surface over which the article may slide without interference when deflected or unloaded from the conveyer belt 4 onto the receiving means.

The deflector blade 62, preferably of wood, is secured to the forward side of the diagonal bar 64 with its forward end adjacent the side rail 21 and having its lower edge slightly above the top surface of the conveyer belt 4 to provide clearance for said belt when the blade is traveling forward and backward thereover. The outer end of the blade 62 extends beyond the terminal ends of the bars 61 and 64, a suitable distance to insure the articles being unloaded or deflected from the conveyer belt 4 to be delivered upon the receiving conveyer or means. The outer lower edge of the blade is also preferably shaped to conform to the angle of the plate 67. By referring to Figure 1 it will be noted that the deflector blade 62 is mounted upon the carriage at an angle with reference to the conveyer belt 4. Thus, when the loaves of bread or articles are brought into contact with the blade they will be deflected from the conveyer belt 4 onto the cooler conveyer 53, or other receiving means clear of the conveyer belt 4.

Means for operating the unloading carriage 54 are provided and consist of a connecting link 68, pivotally connected to the central portion of the carriage by means of a stud 69 mounted in a suitable bracket 71, secured to said carriage. The other end of the connecting link 68 is pivotally connected to one of the links in the chain 46. Thus, when the chain 46 is operated by means of the chain 36, gears 24 and 25, pulley 26 and belt 27, the unloading carriage 54 carrying the deflector blade 62, will move forward and backward upon the rails 55 and 56 between the two extremes, shown by full and dotted lines in Figure 1, thereby unloading or deflecting from the delivery conveyer belt 4, any article which may be placed thereon.

Operation.

The loaves of bread or other articles may be placed upon the conveyer belt 4 by hand or by any suitable means, such as a conveyer 69 (Figure 1). The conveyer belt 4 will carry the articles toward the unloading carriage 54 until said articles are brought into contact with the deflector blade 62. The articles will then be deflected by the forward movement of the carriage and deflector blade from the conveyer belt onto the receiving means, until the carriage 54 reaches the end of its forward movement, shown in full lines in Figure 1.

As the carriage starts its return or backward movement, the loaves of bread, or other articles, will follow the deflector blade 62 until the carriage reaches the limit of its backward movement or comes into the position shown in dotted lines in the above figure, the carriage preferably returning at the same speed as the conveyer belt 4 until it nears the limit of its return movement. The end of the connecting link 68, connected to the chain 46, then passes from the lower side of the sprocket wheel 44, around said sprocket to its upper side, and thence starts its forward movement along a horizontal line to the sprocket wheel 45, carrying with it the carriage 54. As the carriage starts its forward or unloading movement the blade 62 will contact with the articles upon the conveyer belt 4 and unload or deflect the bread or other articles from the conveyer belt 4 onto the cooler conveyer or other receiving means, thereby distributing the articles unloaded over the entire width of the receiving means as shown in full lines in Figure 1.

As the conveyer and the deflector are moving in opposite directions, and preferably at practically the same speed during the forward movement of the deflector, the conveyer brings forward additional loaves of bread at the same time that the deflector is unloading loaves from the conveyer. The bread will, therefore, be removed at each forward movement of the deflector, from a length of conveyer equal to twice the distance the deflector travels forward. I have, in the drawings, merely indicated approximately the path of travel of the loaves of bread without attempting to show the number of loaves that will be discharged at each forward movement of the deflector.

The above apparatus, therefore, provides a very practical and inexpensive means for unloading from a conveyer any movable articles such as loaves of bread, fruit, bags, packages, or other articles of various kinds.

I do not limit myself to the details of construction herein shown and described, as the same may be varied in many particulars without departing from my invention.

I claim as my invention:

1. In a device of the class described, the combination, with a conveyer belt, and means for driving the same, of a transversely positioned deflecting plate arranged in proximity to the carrying surface of said conveyer belt, means for supporting said plate, and means for moving said plate longitudinally of the conveyer belt and in the opposite direction to the travel of said belt.

2. In a device of the class described, the combination, with a conveyer belt and means for driving the same, of a deflecting plate arranged in proximity to the carrying surface of said conveyer belt, means for supporting said plate, means for moving said plate longitudinally of the conveyer belt, in a direction opposite to the travel of the belt, and means for returning the deflecting plate to its original position after each deflecting operation.

3. In a device of the class described, the combination, with a conveyer belt, and means for driving the same, of a deflecting plate arranged in proximity to the carrying surface of said conveyer belt and means for supporting said plate and reciprocating the same longitudinally of said conveyer belt.

4. In a device of the class described, the combination, with a conveyer belt, and means for driving the same, of a deflecting plate arranged in proximity to the carrying surface of said conveyer belt, means for supporting said plate, means for moving said plate longitudinally of the conveyer belt in a direction opposite to the travel of the belt, and receiving means arranged in position to receive the material discharged from the conveyer belt.

5. In a device of the class described, the combination, with a conveyer and means for operating the same, of a deflector arranged in proximity to the operating surface of the conveyer, means for supporting said deflector, means for moving said plate longitudinally of the conveyer and in a direction opposite to the travel of the material moved by the conveyer, and means for returning the deflector to its original position after each conveyer unloading operation.

6. In a device of the class described, the combination, with a conveyer and means for operating the same, of a deflector held at an angle to the direction of motion of the conveyer and arranged in proximity to the operating surface of the conveyer, a reciprocating carriage for supporting the deflector and moving the same longitudinally of the conveyer, and means for reciprocating said carriage.

7. In a device of the class described, the combination, with a conveyer and means for operating the same, of a reciprocating carriage arranged to travel longitudinally of said conveyer and in proximity thereto, and a deflector the operative edge of which is inclined to the direction of motion of the conveyer, said deflector being supported by said carriage and arranged to move over the operating surface of said conveyer, and remove articles or material therefrom.

8. In a device of the class described, the combination, with a conveyer and means for operating the same, of a carriage arranged to travel longitudinally of said conveyer and in proximity thereto, an endless chain having a link connection with said carriage and extending lengthwise of said conveyer, a deflecting plate secured upon said carriage and projecting across the operating surface of said belt, means for operating said conveyer and means for driving said chain.

In witness whereof I have hereunto set my hand this 7th day of November, 1922.

GEORGE DUNSIETH, Jr.